(12) United States Patent
Xu et al.

(10) Patent No.: US 8,260,911 B2
(45) Date of Patent: *Sep. 4, 2012

(54) SCHEDULING METHOD FOR POLLING DEVICE DATA

(75) Inventors: Jinsong Xu, Shenzhen (CN); Yi Song, Shenzhen (CN); Hui Zhao, Shenzhen (CN); Qing Dong, Shenzhen (CN); Yuanxiang Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1049 days.

This patent is subject to a terminal disclaimer.

(21) Appl. No.: 12/196,014

(22) Filed: Aug. 21, 2008

(65) Prior Publication Data

US 2008/0307424 A1  Dec. 11, 2008

Related U.S. Application Data

(63) Continuation of application No. 10/523,270, filed as application No. PCT/CN2003/000800 on Jan. 31, 2005, now Pat. No. 7,433,949.

(30) Foreign Application Priority Data

Sep. 23, 2002 (CN) .................................. 02131775

(51) Int. Cl.
*G06F 15/173* (2006.01)

(52) U.S. Cl. ....................................................... 709/224
(58) Field of Classification Search ........... 709/223–224
See application file for complete search history.

(56) References Cited

U.S. PATENT DOCUMENTS

| 6,083,281 | A * | 7/2000 | Diec et al. ..................... 717/128 |
| 6,119,173 | A * | 9/2000 | Pullen et al. ................... 719/328 |
| 7,047,531 | B2 * | 5/2006 | Dorland et al. ............... 718/103 |
| 7,529,820 | B2 * | 5/2009 | Eatough et al. ............... 709/223 |
| 7,568,025 | B2 * | 7/2009 | Vasudeva ...................... 709/224 |
| 7,711,803 | B2 * | 5/2010 | Doshi et al. ................... 709/223 |
| 2001/0039575 | A1 * | 11/2001 | Freund et al. ................. 709/223 |
| 2002/0019844 | A1 * | 2/2002 | Kurowski et al. ............. 709/201 |
| 2003/0009553 | A1 * | 1/2003 | Benfield et al. ............... 709/224 |

* cited by examiner

*Primary Examiner* — Shirley Zhang

(57) ABSTRACT

A dispatching method for polling device data. The method comprises: sorting managed devices according to their types, sorting various types of data of each device so as to form different modules, and assigning a priority attribute and a polling period attribute to each module; dividing the managed devices into two sets: one set consisting of devices to be polled and the other set consisting of devices whose connection states need to be detected; and polling each module in the set consisting of devices to be polled according to its priority and polling period periodically. Different polling periods can be set and different polling policies can be applied according to data changeability. Polling policies can be changed in real time and flexibly based on the condition of devices.

11 Claims, 2 Drawing Sheets

SCHEDULING METHOD FOR POLLING DEVICE DATA

CROSS-REFERENCE TO RELATED APPLICATIONS

This application is a continuation of U.S. patent application Ser. No. 10/523,270 filed on Jan. 31, 2005, now U.S. Pat. No. 7,433,949. Application Ser. No. 10/523,270 is a National Stage of International Application No. PCT/CN2003/000800, filed Sep. 22, 2003, which claims the benefit and priority of Chinese Application No. 02131775.5, filed Sep. 23, 2002. The entire disclosure of each of the above applications is incorporated herein by reference.

FIELD

The present disclosure relates to network management field, in particular to a dispatching method for polling device node data in a network management system.

BACKGROUND

This section provides background information related to the present disclosure which is not necessarily prior art.

In a network management system based on Simple Network Management Protocol (SNMP), it is necessary to get message for state changes and configuration changes of device nodes in the network in time. Many network management systems apply a method for periodically reading device data, i.e., for polling device data. When there are a huge number of devices, the polling operation will expense a lot of network resources, so a dispatching method for the polling is necessary.

At present, the dispatching methods usually take a device as a unit or a type of devices as a unit for dispatching. When a device is taken as a unit, a polling period is set for each device, data of the device are read once every period and introduced into the network management system. When a type of devices are taken as a unit, a polling period is set for each type of devices and every period devices of the type are polled sequentially for reading data of each device.

When there are small number of devices, such as several devices or tens of devices, the prior dispatching method works well and can be simply implemented. Nevertheless, many devices, such as hundreds and thousands of devices, can cause complications.

When a device is taken as a unit for dispatching, first, control for every device will occupy a lot of system resources, so the system is over loaded and normal operation of other network management functions will be affected. Secondly, it is impossible to make coordination between devices, so it is possible that a lot of devices are polled in the same duration, which will cause a burst network flow and system load on the network and in a serious situation the network will be blocked. In this way, the network management system will collapse due to overload, normal running of network service will be affected in the case that inner-band network management is used. Thirdly, if there are a lot of devices, independent configuration for polling period of each device will greatly increase work load of network administrator, and increase the difficulty of management and operation.

When a type of devices are taken as a unit for dispatching, the burst flow caused by polling management information is controlled in a certain degree and the configuration of polling period is simple, but since all devices are sequentially polled, the polling period is long and the real time response ability is worse, system resources and network bandwidths cannot be utilized sufficiently. When users demand the change of network management system should have a high real-time ability, this dispatching method cannot satisfy the requirement. In addition, there is little coordination between various types of devices, and all devices are processed jointly, so individuation cannot be realized.

Besides, changeability of data on a device is different but the prior dispatching method reads all data on a device with the same period, so various data on the same device cannot be control individually. Therefore, it is impossible to have a shorter period for the data that change frequently and a longer period for the data that change rarely.

In addition, the prior dispatching methods can only control the polling period but cannot control the polling time, so it is impossible to distribute the polling to the idle time of services on the network in the case of inner-band network management.

SUMMARY

This section provides a general summary of the disclosure, and is not a comprehensive disclosure of its full scope or all of its features.

A dispatching method for polling device data includes the following:

reading device type description data, in which managed devices are sorted according to their types, various types of data of each managed device are sorted to different modules, and a priority attribute and a polling period attribute are assigned to each module respectively;

determining a first set of devices to be polled from the managed devices, in which the first set of devices at least includes an operation device set; and when a system polling is initiated, dispatching a periodical polling by determining at least one module to be polled currently from the operation device set according to the priority attribute and the polling period attribute of the operation device set, in which a first set of data items for describing the at least one module includes a device ID, a module ID, a task ID, an occupied flag, an activation time and a priority;

inserting the at least one module to a current polling task queue according to said periodical polling;

setting a polling initiating time at the summation of the current time plus a polling interval;

determining whether there is a free task in the current polling task queue based on the occupied flag; if so, continuing the process, otherwise the of determining whether there is a free task;

selecting a next device module to be polled from the operation device set; and determining whether the information obtained by selecting a next device module to be polled is Null; if not, assigning a task ID to the selected device module and inserting the task ID into the current polling task queue, and simultaneously sending a message for initiating the polling of said device module to the corresponding daemon process, then returning to the determining whether there is a free task; if so, determining whether all tasks in the current polling task queue are in free state, if all tasks are in free state, ending the process, otherwise returning to the determining whether there is a free task;

in which said activation time is the current time when inserting a task and is updated when a report about executing situation of the task sent from a daemon has been received; said occupied flag is set free after a corresponding message showing the task has been completed is received or the polling task is overtime.

A dispatching method for polling device data, which includes:

determining a set of device modules to be polled;

generating a polling task queue;

selecting a next device module to be polled from the determined set of device modules according to a priority attribute and a polling period attribute of each device module, when there is a free task in the polling task queue, wherein the device modules are obtained by sorting various types of data of each managed device;

inserting the selected next device module to be polled in the polling task queue, sending a message for initiating the polling of the device module to a corresponding daemon process; and returning to the process of selecting the next module to be polled.

A server, including a processor configured to implement the following:

determine a set of device modules to be polled according to priority attributes and polling period attributes of the device modules, wherein the device modules are obtained by sorting various types of data of each managed device;

generate a polling task queue;

select a next device module to be polled from the determined set of device modules according to the priority attribute and the polling period attribute of each device module, when there is a free task in the polling task queue;

insert the selected next device module to be polled in the polling task queue, send a message for initiating the polling of the device module to a corresponding daemon process; and return to the process of selecting the next module to be polled.

A network management system, including a server which performs communication with a terminal, in which the server is configured to implement the following:

determine a set of device modules to be polled according to priority attributes and polling period attributes of the device modules, wherein the device modules are obtained by sorting various types of data of each managed device;

generate a polling task queue;

select a next device module to be polled from the determined set of device modules according to the priority attribute and the polling period attribute of each device module, when there is a free task in the polling task queue;

insert the selected next device module to be polled in the polling task queue, send a message for initiating the polling of the device module to a corresponding daemon process; and return to the process of selecting the next module to be polled.

The devices are divided into groups according to their types and inner modules, and assigned a corresponding priority and polling period, so various type of data of the same device can be controlled individually based on their changeability. For example, the data changed more often can be polled more frequently, and the data changed less often can be polled less frequently.

The managed devices are divided into two sets: a set of current display devices and a set of current operation devices. In this way, the devices being operated by users are polled. Besides, different data of the same device is individually set with different polling periods based on the data changeability. The number of polling tasks can be adjusted based on the configuration of network management system and network bandwidth so that the system resources can be utilized reasonably and all polling can be reasonably dispatched.

The devices in the network management system are dispatched jointly. In addition, device data and connection state of device are processed individually. Accordingly, the total system load and network load of the network management system can be controlled effectively.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
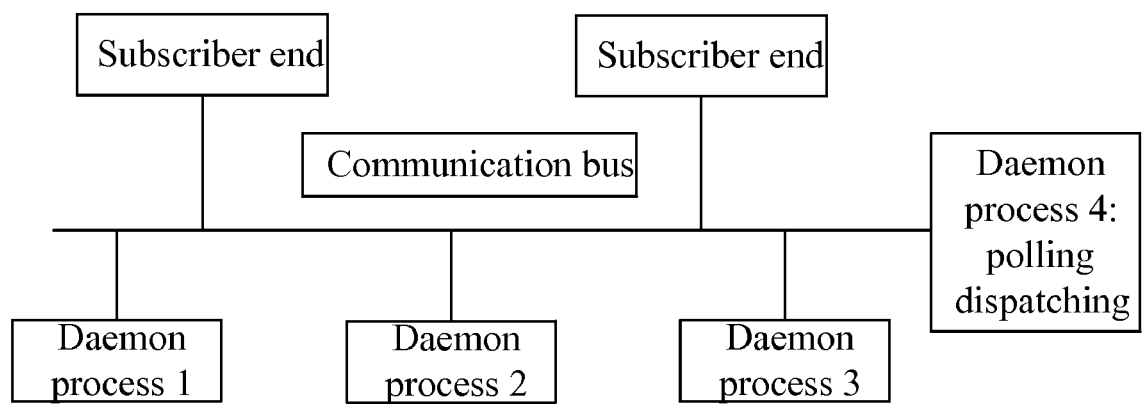
FIG. 1 is a diagram illustrating the architecture of a network management system.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As described herein, all managed devices in the current network management system are sorted according to their types, various types of data in each device are sorted so that various modules are formed; and then every module is assigned a priority attribute and a polling period attribute. Among them, the priority shows that which polling sequence should be taken for device data. If two modules have the same priority, then it shows that there is no sequence relationship between them, i.e. either one is permitted to be polled first. The polling period represents a polling interval of the module. Consequently, different polling periods for different kinds of data of the same device can be set and different polling policies according to the changeability of data can be employed. For example, the data changed more often can be polled more frequently, and the data changed less often can be polled less frequently.

Furthermore, as described herein, all the managed devices are divided into two sets: one is the set consisting of devices that need to be polled, and the other is the set consisting of devices whose connection states need to be detected. For the former, all data is polled periodically, and for the later Ping operation is executed periodically but without reading the device data. Therefore, it is possible to change the polling policy in real time and flexibly based on the device situation, for example, taking priority for polling the current running devices. If a device is not at the current active window, but it is desired that the device should be polled too, then it is necessary only to add the device in the set consisting of devices that need to be polled at the daemon.

By dividing all the managed devices into two sets, all devices in the network management system can be dispatched jointly, and joint dispatch for polling tasks can be provided according to the possible maximum number of polling devices and the bandwidth of the network, so the total system load and network load of the network management system can be controlled effectively, and the system resources can be used more reasonably.

In general, a network management system consists of many subscriber terminals and many server programs (daemon processes); as described herein, a specialized dispatching program of polling, i.e. daemon process 4, is added to the original architecture, as shown in FIG. 1. Other system structures can also be used.

The following data structures are defined for the dispatching process of polling:

1. Device Type Description

| Device type | Module ID | Priority | Polling interval multiple | Corresponding daemon ID |
|---|---|---|---|---|
| | | | (default value is one) | |

In the table, the combination of the device type and module ID is a unit index. The polling interval multiple is a polling period attribute of the module that is the ratio of the module polling period and the system polling period (basic polling period). For example, if the polling interval multiple of a module is two, then the polling period of the module is double of the polling period of a module whose polling interval multiple is one.

2. Current Operation Device Set (OperationList)

| Device ID | Module ID | Device type | The last polling time |
|---|---|---|---|
| Device 1 | Module 1 | | Sorting by this value in memory |
| Device 1 | Module 2 | | |
| Device 1 | Module 3 | | |
| Device 1 | Module 4 | | |
| Device 2 | | | |
| Device 3 | | | |
| ... | | | |

In the table, the combination of the device ID and module ID is a unit index.

3. Current Display Device Set (DisplayList)

| Device ID | Connection state |
|---|---|
| | |

In this embodiment, the set consisting of devices that need to be polled and the set consisting of devices whose connection states need to be detected are the OperationList and DisplayList respectively. The DisplayList is the set of devices that can be found by subscribers; if other windows in an interface hide information of a device, then the device does not belong to this set. The OperationList is a set of devices that are included in an interface that is being operated by subscribers, i.e. the devices included in an activated window at the subscriber end. The above-mentioned two sets are reported to the server by subscribers, and the server will summarize all of them to form DisplayList and OperationList of the whole network management system.

4. Current Polling Tasks Queue

| Task ID | Occupied flag | Module ID | Device ID | Activation time | Priority |
|---|---|---|---|---|---|
| 1 | [busy/free] | | | | |
| 2 | | | | | |
| 3 | | | | | |
| ... | | | | | |
| n (n = maximum number of polling tasks) | | | | | |

Each time when initiated, the polling task is put in the above table with a busy flag and an initiating time. The busy flag will be released after the task completion information is received or the task is overtimed. Whether a task is overtimed is determined through the interval between the current time and the activation time. If the interval excesses the polling overtime that is pre-set in the global data below, the task is overtimed. The activation time is set as the current time when the task is initiated, and then, when a report of executing situation for the task sent by the other daemon processes periodically is received, the activation time will be updated.

5. Global Data

| | |
|---|---|
| Polling interval | It shows the expected interval between this initiating time and the next initiating time for polling of the whole system; if polling all devices once needs more time then this one, then devices cannot be polled with this interval. |
| Initiating time of polling (hours/minutes/seconds) | In memory, it is initiated to the absolute time with information of current year, month and day. |
| Maximum number of polling tasks | It shows the maximum number of simultaneous polling tasks supported by the network management system. |
| Polling overtime period | When other daemon processes have received a polling command from the dispatching process, they need report periodically to the dispatching process whether the polling task is completed; if there is no report at overtime, the dispatching process will consider that the operation is ended. |
| Ping overtime period | |
| Ping repeated times | |

Based on the data mentioned above, the polling tasks are dispatched with the following.

In 1, firstly, all kinds of parameters are initiated; description data of device types and polling overtime period are read. Then, DisplayList and OperationList are generated through interfaces of other daemon processes; current polling task queue is generated based on the maximum number of polling tasks. If there is an initiating time of polling, then the timer is set as to initiate the dispatching thread for polling at the initiating time, otherwise the timer is set as to initiate the dispatching thread immediately and the process goes to 2. Meanwhile connection state detecting thread is initiated, and the process goes to 3.

Figure 2:
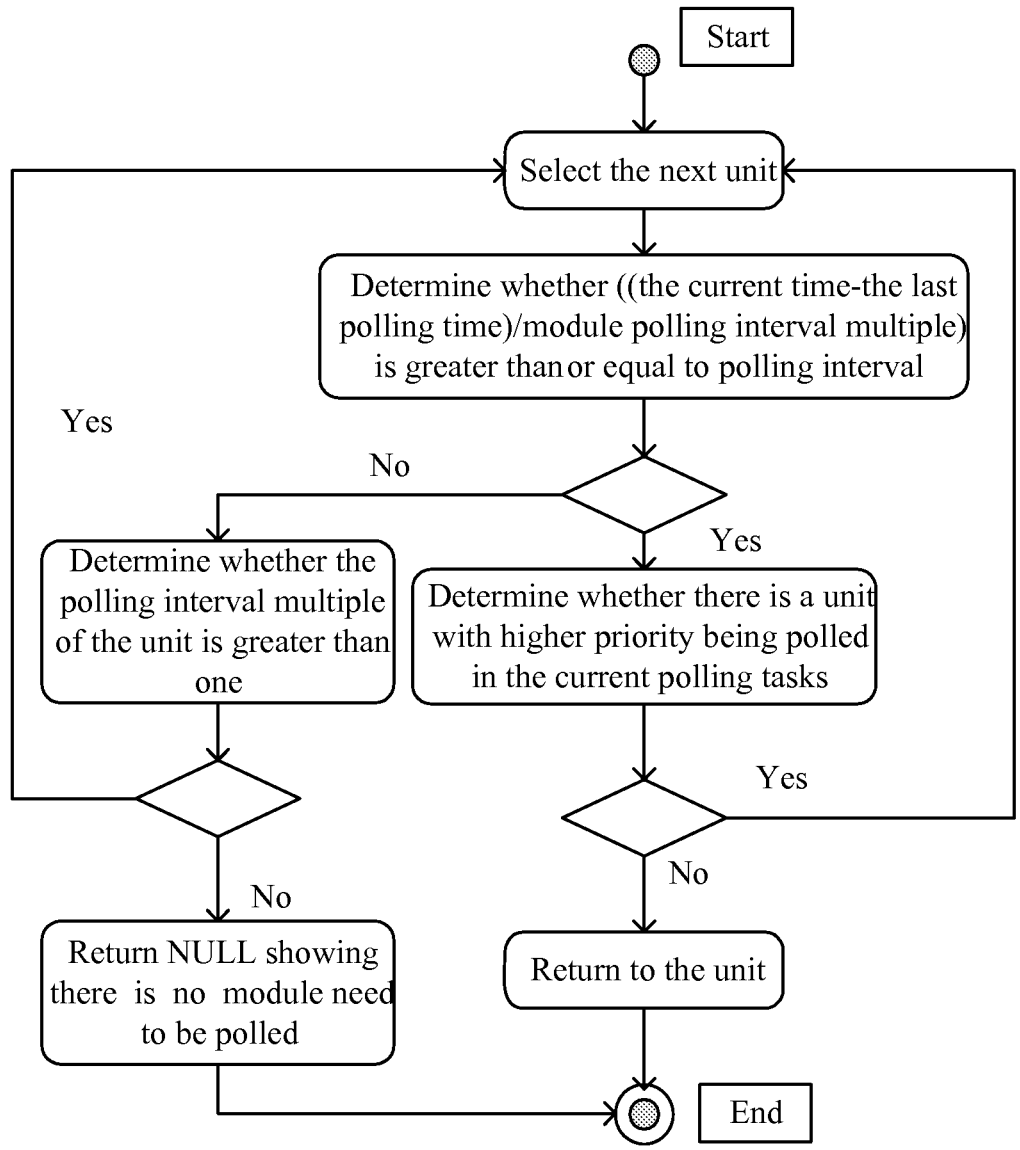
FIG. 2 is a flowchart illustrating selection of a polling module.

In 2, every module of every device is polled in turn according to its polling priority and polling interval multiple. Specifically:

a. setting initiating time of polling at the summation of the current time plus the polling interval;

b. determining whether there is a free task in the current polling task queue; if so, then continuing the process, otherwise returning to b;

c. selecting the next unit (device ID+module ID) to be polled from the OperationList, wherein the, further including, as shown in FIG. 2:

c1. selecting the next unit from the OperationList;

c2. determining whether [(the current time−the last polling time)/polling interval multiple of the module] is greater than or equal to the polling interval; if so, executing c3 continuously, otherwise going to c4;

c3. determining whether there is a unit with higher priority being polled in the different module polling tasks of the current same device; if so, returning to c1, otherwise returning the unit information and ending c;

c4. determining whether the polling interval multiple of the unit is greater than one; if so, returning to c1, otherwise returning a NULL to show that no any module needs to be polled and ending the c.

d. when the information returned in c is a NULL, determining whether all items in the OperationList are in free state; if so, it showing that one polling for the system is ended and ending 2, otherwise returning to b.

e. when the information returned in c is not a NULL, assigning a task ID to the selected unit, then inserting the task ID in the OperationList; at the same time sending information for initiating a polling module of the device to the corresponding daemon process and returning to b.

In 3, devices are selected in turn according to the DisplayList and Ping operations are made for the selected devices. If connection state of the device has been changed, then other daemons and foregrounds will be informed.

During the process of selecting the next unit to be polled from the OperationList in c, the dispatching process also receives reports about whether a polling task is ended from other daemons. If the polling task is ended, the occupied flag of the task is released in the list of current polling tasks and the task is set free. If the polling task is not ended, the activation time of the task is updated to the current time. If the task is overtimed, the occupied flag of the task is released and the task is set free also.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A dispatching method for polling device data, comprising:

reading device type description data, wherein managed devices are sorted according to their types, various types of data of each managed device are sorted to different modules, and a priority attribute and a polling period attribute are assigned to each module respectively;

determining a first set of devices to be polled from the managed devices, wherein the first set of devices at least comprises an operation device set; and when a system polling is initiated, dispatching a periodical polling by determining at least one module to be polled currently from the operation device set according to the priority attribute and the polling period attribute of the operation device set, wherein a first set of data items for describing the at least one module comprises a device ID, a module ID, a task ID, an occupied flag, an activation time, a priority and a corresponding daemon ID;

inserting the at least one module to a current polling task queue according to said periodical polling;

setting a polling initiating time at the summation of the current time plus a polling interval;

determining whether there is a free task in the current polling task queue based on the occupied flag; if so, continuing a process of selecting a next device module to be polled from the operation device set, otherwise returning to the determining whether there is a free task;

selecting the next device module to be polled from the operation device set; and determining whether the information obtained by selecting a next device module to be polled is Null; if not, assigning a first task ID to the selected device module and inserting the first task ID into the current polling task queue, and simultaneously sending a message for initiating the polling of said device module to a daemon process corresponding to a first daemon ID, then returning to the determining whether there is a free task; if so, determining whether all tasks in the current polling task queue are in free state, if all tasks are in free state, ending the process, otherwise returning to the determining whether there is a free task;

wherein said activation time is the current time when inserting a task and is updated when a report about executing situation of the task sent from a daemon has been received; said occupied flag is set free after a corresponding message showing the task has been completed is received or the task is overtime;

wherein the selecting the next device module to be polled from the operation device set comprises:

(c1) selecting the next device module;

(c2) determining whether [(the current time−the last polling time)/polling interval multiple of the selected next device module] is greater than or equal to the system polling interval, if so, going to (c3), otherwise going to (c4); and (c3) determining whether there is a module with higher priority of the selected next device module being polled in the current polling task queue; if so, returning to (c1), otherwise returning the device module information and ending the selecting a next device module to be polled from the operation device set; or (c4) determining whether said polling interval multiple is greater than one; if so, returning to (c1), otherwise returning a message of NULL and ending the selecting a next device module to be polled from the operation device set;

wherein the polling interval multiple is a polling period attribute of the module that is the ratio of the module polling period and the system polling period.

2. The method of claim 1, further comprising:

setting a maximum number of polling tasks;

wherein the current polling task queue is generated according to said maximum number of polling tasks.

3. The method of claim 1, further comprising:

before reading device type description data, generating a data structure for describing a device type after sorting managed devices according to their types and sorting various types of data of each managed device to different modules, wherein a second set of data items for describing the data structure comprises a device type, a module ID, a priority, a polling interval multiple and a corresponding daemon ID.

4. The method of claim 3, wherein a third set of data items for describing the first set of devices comprises a device type and a last polling time; and the method further comprises:

determining a second set of devices of which connection states need to be detected from the managed devices, wherein the second set of devices at least comprises a display device set; and a fourth set of data items for describing the second set of devices at least comprises a device ID and a connection state.

5. The method of claim 4, further comprising:

selecting sequentially a device from the set consisting of devices whose connection states need to be detected and making ping operation for the device; wherein the success of ping operation shows said device is connected to the network management system and failure of ping operation shows said device is not connected to the network management system; if the connection state of said device is changed, notifying other daemons and foregrounds about this condition.

6. A dispatching method for polling device data, comprising:

determining a set of device modules to be polled, generating a polling task queue;

selecting a next device module to be polled from the determined set of device modules according to a priority attribute and a polling period attribute of each device module, when there is a free task in the polling task queue, wherein the device modules are obtained by sorting various types of data of each managed device;

inserting the selected next device module to be polled in the polling task queue, sending a message for initiating the polling of the device module to a corresponding daemon process; and returning to the process of selecting the next module to be polled;

wherein the selecting the next device module to be polled comprises:

(c1) selecting the next device module;

(c2) determining whether [(the current time−the last polling time)/polling interval multiple of the selected next device module] is greater than or equal to a system polling interval, if so, going to (c3), otherwise going to (c4); and (c3) determining whether there is a device module with higher priority of the selected next device module being polled in the polling task queue; if so, returning to (c1), otherwise returning the device module information and ending the selecting a next device module to be polled; or (c4) determining whether said polling interval multiple is greater than one; if so, returning to (c1), otherwise returning a message of NULL and ending the selecting a next device module to be polled;

wherein the polling interval multiple is a polling period attribute of the module that is the ratio of the module polling period and the system polling period.

7. The method of claim 6, further comprising:
setting a maximum number of polling tasks;
wherein the polling task queue is generated according to said maximum number of polling tasks.

8. The method of claim 6, further comprising:
generating a data structure for describing types of the device modules, wherein data items for describing the data structure comprises a device type, a module ID and a corresponding daemon ID.

9. The method of claim 6, wherein the process of inserting the selected next device module to be polled in the polling task queue comprises:
if the information returned by selecting a next device module to be polled is not Null, assigning a first task ID to the selected device module obtained from the information and inserting the first task ID into the polling task queue.

10. A server, comprising a computer processor and memory, wherein the computer process is configured to
determine a set of device modules to be polled according to priority attributes and polling period attributes of the device modules, wherein the device modules are obtained by sorting various types of data of each managed device;
generate a polling task queue;
select a next device module to be polled from the determined set of device modules according to the priority attribute and the polling period attribute of each device module, when there is a free task in the polling task queue;
insert the selected next device module to be polled in the polling task queue, send a message for initiating the polling of the device module to a corresponding daemon process; and return to the process of selecting the next module to be polled;
wherein the selecting the next device module to be polled comprises:
(c1) selecting the next device module;
(c2) determining whether [(the current time−the last polling time)/polling interval multiple of the selected next device module] is greater than or equal to a system polling period, if so, going to (c3), otherwise going to (c4); and
(c3) determining whether there is a device module with higher priority of the selected next device module being polled in the polling task queue; if so, returning to (c1), otherwise returning the device module information and ending the selecting a next device module to be polled; or
(c4) determining whether said polling interval multiple is greater than one; if so, returning to (c1), otherwise returning a message of NULL and ending the selecting a next device module to be polled;
wherein the polling interval multiple is a polling period attribute of the module that is the ratio of the module polling period and the system polling period.

11. A network management system, comprising a server which performs communication with a terminal, wherein the server comprising a computer processor and memory, wherein the computer processor is configured to
determine a set of device modules to be polled according to priority attributes and polling period attributes of the device modules, wherein the device modules are obtained by sorting various types of data of each managed device;
generate a polling task queue;
select a next device module to be polled from the determined set of device modules according to the priority attribute and the polling period attribute of each device module, when there is a free task in the polling task queue;
insert the selected next device module to be polled in the polling task queue, send a message for initiating the polling of the device module to a corresponding daemon process; and return to the process of selecting the next module to be polled;
wherein the selecting the next device module to be polled comprises:
(c1) selecting the next device module;
(c2) determining whether [(the current time−the last polling time)/polling interval multiple of the selected next device module] is greater than or equal to a system polling period, if so, going to (c3), otherwise going to (c4); and
(c3) determining whether there is a device module with higher priority of the selected next device module being polled in the polling task queue; if so, returning to (c1), otherwise returning the device module information and ending the selecting a next device module to be polled; or
(c4) determining whether said polling interval multiple is greater than one; if so, returning to (c1), otherwise returning a message of NULL and ending the selecting a next device module to be polled;
wherein the polling interval multiple is a polling period attribute of the module that is the ratio of the module polling period and the system polling period.

* * * * *